United States Patent Office 3,064,687
Patented Nov. 20, 1962

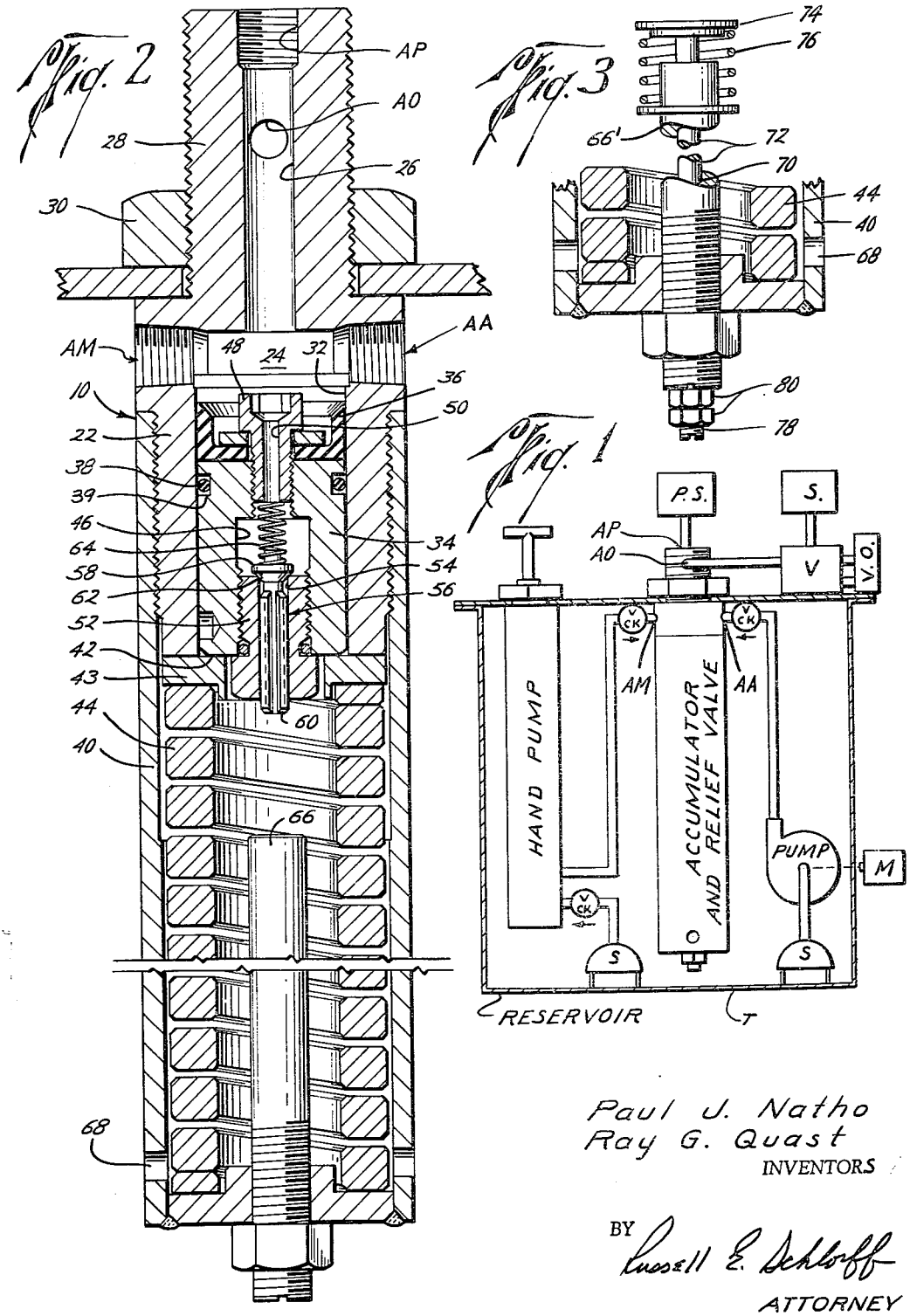

3,064,687
COMBINED ACCUMULATOR-RELIEF VALVE
Paul J. Natho and Ray G. Quast, Houston, Tex., assignors to ACF Industries Incorporated, New York, N.Y., a corporation of New Jersey
Filed Aug. 7, 1958, Ser. No. 753,810
3 Claims. (Cl. 138—31)

This invention relates to a hydraulic system and particularly to a novel combined accumulator-relief valve incorporated therein.

In a closed hydraulic system using an incompressible fluid, a loss or leakage of one drop of fluid will theoretically reduce the pressure in the system from the rated pressure to zero; therefore, it is desirable to provide such systems with an accumulator which provides storage under pressure of an extra amount of the incompressible hydraulic fluid which will be available to replace small amounts lost due to leakage. The accumulator also provides means for maintaining a nearly constant pressure during the loss of a few drops of fluid and, therefore, will maintain the system within its set pressure range for a longer period of time without the necessity of a constant starting of the motor driven pump to replace each drop of fluid lost. In order to prevent excessive and dangerous pressures in a hydraulic system, a relief valve is also necessary.

The present invention provides a closed hydraulic system which has a novel combined accumulator-relief valve. The accumulator portion provides the storage of an adequate amount of fluid under pressure. As previously mentioned, this fluid can be utilized to replace small losses in the system so that constant starting of the motor driven pump to provide small amounts of make-up fluid is unnecessary, even though the system itself may not be operated for a long period of time. The relief valve portion provides protection against excessive pressures. By combining the accumulator and relief valve into one organization, not only is a satisfactory unitary structure provided but also the necessary separate connections for each piece are eliminated. The relief valve portion of the combined device is of the pressure sealing type; that is, pressure on the valve tends to hold the valve in a closed position and it is only opened by external means when the predetermined set pressure has been reached. It is also possible to provide the relief valve portion with means which will permit a definite amount of blow-down.

It is an object of the present invention to provide a closed hydraulic system utilizing a combined accumulator-relief valve.

It is another object to provide a unitary structure combining an accumulator and a pressure sealing type relief valve.

It is another object to provide a pressure sealing type relief valve having means to control the amount of blow-down.

It is a further object to generally improve upon relief valves of the pressure sealing type.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description and are shown in the accompanying drawings, forming a part of the specification, wherein:

FIG. 1 is a schematic view of a closed hydraulic system incorporating the novel combined accumulator-relief valve of the present invention.

FIG. 2 is a cross sectional view of the combined accumulator-relief valve shown in FIG. 1.

FIG. 3 is a sectional view showing the lower half of the relief valve portion shown in FIG. 2 incorporating the novel blow-down means.

FIG. 1 shows a closed hydraulic system which has been designed for the automatic operation of a valve in an underwater location. Inasmuch as the system will be at rest a large portion of the time and will be inaccessible by normal means, failure of any particular part is highly undesirable. The system has been incorporated in a reservoir tank T. A submersible pump provided with a strainer S is located in the tank. Power for the pump is supplied by an electric motor M. A hydraulic line extends from the outlet of the pump to an inlet port AA of a combined accumulator and relief valve 10. To provide emergency manual operation there is a hand pump which has an inlet strainer S. A hydraulic line extends from the outlet of the hand pump to an inlet AM of the accumulator 10. The hydraulic fluid, coming from either the motor driven pump or the hand pump, flows out of the accumulator-relief valve through outlet AO and through a hydraulic line to a four-way valve V controlled by a solenoid S attached to the top of the tank. Depending upon the setting of the four-way valve, one side or other of the valve operating cylinder VO is pressurized. A pressure switch PS which starts and stops the motor M is connected to the outlet AP of the accumulator-relief valve 10.

The accumulator-relief valve 10 permits the storage, under pressure, of a determined amount of the incompressible hydraulic fluid and eliminates the necessity of constant starting operation of the electrically driven pump to replace each drop of fluid lost from the system, and also provides a safety valve for the system relieving the system at a predetermined set pressure.

The combined accumulator-relief valve, which will be described in detail momentarily, is essentially provided with a spring loaded piston which is moved as the pressure in the system builds up. The piston is of sufficient size to permit the storage of an ample amount of fluid to replace small fluid losses from the system. As the piston moves, the spring is compressed and, therefore, the fluid so stored is under pressure. When the system reaches the set pressure, the pressure switch PS will cut off the motor M; however, as a rule the motor driven pump will continue to coast for a short period delivering more fluid and thereby building up a greater pressure in the system. Normally, the coasting of the motor will not increase the pressure more than 50–75 p.s.i.; however, in the event the pressure switch fails to turn off the motor at the proper setting or for any other reason the pressure should continue to build up, the relief valve portion will take over and relieve the system at the pressure for which the relief valve has been set. Accordingly, there is fluid stored in the accumulator backed up by spring pressure. If there is a small leak, the spring will move forward and continue to maintain the fluid under pressure; whereas if there is no accumulator, the loss of one drop in a closed system will theoretically drop the pressure to zero. The system is normally set to operate within a given range and although the loss of any fluid will cause the pressure to drop slightly, the loss of a minute amount will not cause the motor to be started to replace such loss. Instead, the motor will not be started until there is a sufficient loss to drop the pressure in the system below the low limit set on the pressure switch.

The combined accumulator-relief valve 10, as previously mentioned, functions both as an accumulator to store fluid under pressure and as a relief valve to relieve any pressure in excess of the maximum set pressure. The housing 22 of the valve 10 is provided with the two inlet ports AA and AM connected by a common passage 24. A passage 26 extending from the passage 24 leads to the two outlet ports AO and AP. The inlet port AA connects with the automatic pump and the inlet port AM connects with the manual emergency hand pump. If only one source of pressure is being used, the inlet AM can be plugged or eliminated. The outlet AO connects to the four-way valve V which selectively distributes the fluid to the valve operator VO. The outlet AP is connected to the pressure switch PS which controls the pressure in the system. The upper portion of the housing 22 is provided with a reduced neck portion 28 which is provided with threads to receive a nut 30. The combined accumulator-relief valve 10 can be attached to the top wall of the tank by inserting the neck 28 through a hole in the tank and tightening the nut 30.

A central, axially aligned bore 32 is in communication with the various ports through connection to passage 24. Therefore, any fluid that enters the inlet ports will also flow into the bore 32. Slidingly mounted in the bore 32 is a piston 34. A seal between the piston and the bore is maintained by a cup seal 36 attached to the head of the piston. An additional seal is provided by an O-ring 38 located in an annular groove 39. An outer cylindrical case 40 is threadably attached to the housing 22. Located in the case 40 and contacting the end 42 of the piston 34 through a spring follower 43 is a spring 44. The spring is compressed during initial assembly to provide a preload on the piston 34. The above described structure is the portion of the accumulator-relief valve which functions as an accumulator.

Fluid from the automatic or manual pump enters the unit through inlet passages AA or AM and flows into the passage 24 and bore 32. The fluid also flows through passage 26 and out of the outlet ports AP and AO. As the pressure in the system builds up sufficiently to overcome the preload in the spring 44, the piston 34 moves down creating space for a larger volume of fluid than necessitated by the closed system. The movement of the piston 34 further compresses the spring 44. When the system is up to pressure, the pressure switch PS stops the electric motor M. Normally, the motor will coast for a relatively short period and build up a slight amount of additional pressure. This slight addition will not have any deleterious effects. If, with the system up to pressure and at rest, there should be a slight leak, the pressure will only drop slightly, since the spring 44 will exert force on piston 34 to maintain pressure. Therefore, the motor will not have to be started until there is sufficient leakage to drop the pressure below the minimum setting of the pressure switch. The accumulator eliminates the constant intermittent operation of the motor operated pump to replace each drop of fluid lost.

In order to prevent rupture of the various elements in the hydraulic system, it is customary to provide a relief valve in the system. The relief valve in the present system is incorporated in the combined accumulator-relief valve 10. Since it is contained within the reservoir, any discharge flows directly into the reservoir and, therefore, there is no loss of fluid. The piston 34 is provided with a central axial passage 46. At the head end of the piston there is a member 48 threadedly engaged into the passage 46. The head of this member 48 cooperates to hold the cup seal 36 previously described in position. The member 48 has a passage 50 which is in communication with the bore 32. The end 42 of the piston is provided with a member 52 which is threadedly engaged with the end of the passage 46. The member 52 is provided with a passage 54. Mounted in the passage 54 is a poppet valve 56 which has a conical valve head 58 and a fluted stem 60. The head 58 in conjunction with the seat 62 formed in the edge of the passage 54 forms the seal for the valve. The stem 60 is located in the passage 54 and the end thereof extends past the end of the member 52. It has been found that a valve member formed of nylon works satisfactorily; however, other well known materials commonly used for trimming valves may be used. A spring 64 is interposed between the member 48 and the head 58 of the valve 56 to supply an initial seating force to the valve 56. The valve 56 is of the pressure sealing type; that is, normal pressure in the system operates to hold the valve closed. As previously mentioned, an increase in pressure in the system causes the piston 34, which carries the poppet valve 56, to move. Such movement is resisted by the spring 44, and as long as the pressure does not exceed the safe operating pressure set for the system, the valve 56 remains closed. If, however, the pressure exceeds the maximum allowable pressure, the movement of the piston 34 will be such as to cause the end of the stem 60 to strike an arresting member 66 extending upwardly from the casing 40. Upon striking the arresting member 66, any further movement of valve 56 is prevented and, therefore, any additional movement of the piston 34, caused by a further increase of pressure, will cause the seat 62 to be disengaged from the valve head 58. Upon disengagement of the valve, fluid can flow past the fluted stem relieving the excess pressure. The discharged fluid will flow through port 68 in the casing wall 40 and enter into the reservoir; therefore, no fluid will be lost. The end of the arresting member 66 is provided with threads permitting it to be moved toward and away from the piston to adjust the relieving pressure.

In the above described structure, as soon as the arresting member 66 disengages the valve head 58 from its seat, the pressure will be relieved. The force of the spring 44 will tend to push the piston 34 away from the arresting member 66. As the piston 34 moves away, the spring 64 will again force the valve head 58 against its seat and the pressure of the fluid in the bore will keep it seated until pressure has again built up to the relieving point. The spring 64 is a part of the piston and valve assembly and it is not stretched or weakened as the pressure in the valve increases. Since it is part of the assembly, the length remains constant and it is not weakened by an increase of pressure. The valve 56 works with a pop action; that is, it builds up to the point of relieving and then quickly relieves the excess pressure and immediately reseats. By having a downstream seat, there has been no tendency for the valve to weep, since the pressure of the fluid on the valve head 58 will tend to keep the valve seated at all times until the relieving point is reached.

If instead of a pop action a blow-down of a definite amount is desired, the arresting member may be constructed as shown in FIG. 3. The member 66' is provided with an axial passage 70 in which is located a cylindrical member 72 having a head portion 74. A spring 76 forces the head of the member 72 away from the arresting member 66'. The spring 76 exerts a force greater than the spring 64; however, the force is not as great a force as is exerted by the hydraulic pressure on valve head 58. The end 78 of the member 72 is provided with a pair of adjustable nuts 80 to provide selective adjustment of the spring loading of the member 72. With the use of the blow-down assembly, the relieving point will not be reached until the head 74 has been stopped by the arresting member 66'. Since, as previously explained, the hydraulic force on valve head 58 is greater than the force exerted by spring 76, the head 74 will be depressed without any unseating of the valve 58. At such time any additional movement will cause the valve head 58 to be unseated in the same manner as previously described. However, the valve 56 will not immediately reseat as in the case of the structure shown in FIG. 2, since the spring 76 will cause the head 74 to follow the valve stem 60 and keep the valve head 58 from closing. Since the magnitude of spring 76 is greater than the reseating spring 64, such construction will permit a definite controlled amount of pressure reduction which is not possible with an ordinary pop action type relief valve. Once sufficient pressure has been relieved to allow the piston 34 to be moved back by the spring 44 a sufficient distance so that the stem 60 is no longer in contact with the extended head 72, the reseating spring 64 will close the valve 56 and pressure in the bore 46 will tend to keep it closed.

Broadly, the invention discloses a novel combined accumulator-relief valve for use in a closed hydraulic system. The relief valve portion incorporates various novel features which may be utilized advantageously in a relief valve.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

We claim:

1. A combined accumulator and relief valve comprising: a housing provided at one end with an inlet port opening into a chamber, an outlet port and a cylindrical bore extending from the inlet port end in communication with said chamber, a piston located in said cylindrical bore, means establishing a seal between said piston and said bore, one end of said piston subject to the fluid in said chamber and movable in said cylindrical bore to increase the effective area of said chamber, a portion of the housing extending past the cylindrical bore, a spring between the other end of said piston and the end of the housing removed from the inlet port, said spring resisting movement of said piston, an axially aligned bore through said piston, a valve seat formed in said axially aligned bore, a valve member in said axially aligned bore cooperating with said valve seat, a portion of said valve member extending past said valve seat, a spring applying initial seating force to said valve member, the valve member also subject to the fluid in the housing, valve arresting means formed of an elongated body provided with an end means which contacts the extending portion of the valve, said valve arresting means extending from the end of the housing removed from the inlet port, said valve arresting means designed upon increase of pressure in the chamber moving the piston toward said valve arresting means to contact the portion of valve extending past said valve seat and restrain further movement thereof so that upon further increase of pressure and movement of said piston the valve member is disengaged from its seat permitting excessive pressure to be relieved and means permitting the expelling of fluid flowing past the open valve.

2. A combined accumulator and relief valve comprising: a housing provided at one end with an inlet port opening into a chamber, an outlet port and a cylindrical bore extending from the inlet port end in communication with said chamber, a piston located in said cylindrical bore, means establishing a seal between said piston and said bore, one end of said piston subject to the fluid in said chamber and movable in said cylindrical bore to increase the effective area of said chamber, a portion of the housing extending past the cylindrical bore, a spring between the other end of said piston and the end of the housing removed from the inlet port, said spring resisting movement of said piston, an axially aligned bore through said piston, a valve seat formed in said axially aligned bore, a valve member in said axially aligned bore cooperating with said valve seat, a portion of said valve member extending past said valve seat, a spring applying initial seating force to said valve member, the valve member also subject to the fluid in the housing, valve arresting means extending from the end of the housing removed from the inlet port, said valve arresting means provided with a spring loaded member designed to engage the extending portion of said valve member upon increase of pressure in the chamber moving the piston toward said valve arresting means and move with said valve member until stopped by the arresting means at which time further movement of the valve is arrested and further movement of the piston will cause the valve to be opened to discharge fluid, the spring loaded member of the arresting means having a greater force than the initial seating spring of the valve member so that the spring loaded member will follow the return of the piston remaining in contact with the end of the valve and retaining the valve open until the piston moves sufficiently to completely disengage the end of the valve from contact with the spring loaded member.

3. A combined accumulator and relief valve comprising a housing provided at one end with a fluid inlet port and a cylindrical bore extending from the inlet port end in communication with said inlet port, a piston located in said cylindrical bore, means establishing a seal between the circumferential walls of said piston and said bore, one end of said piston subject to the fluid in said cylindrical bore, a portion of the housing extending past said bore, a spring between the other end of said piston and the end of the housing removed from said inlet port, said spring resisting movement of said piston, an axially aligned bore through said piston, a valve seat in said axially aligned bore, a valve member in said axially aligned bore cooperating with said valve seat, said valve member subject to the fluid in said cylindrical bore so that pressure in the housing tends to hold said valve member in sealing contact with said valve seat, a spring in said axially aligned bore applying initial pressure to said valve member, a portion of said valve member extending past said valve seat, valve arresting means extending from the end of the housing removed from the inlet port, said valve arresting means designed upon increase of pressure in the chamber moving the piston toward said valve arresting means to contact the portion of said valve member extending past the valve seat and restrain further movement thereof so that upon further increase of pressure and movement of said piston the valve member is restrained and disengaged from its seat permitting excessive pressure to be relieved, said valve arresting means movable toward and away from said valve member requiring more or less movement of the piston before contact between the arresting means and end of the valve seat is made thereby adjusting the relieving pressure, and means permitting the expelling of fluid flowing past the open valve.

References Cited in the file of this patent

UNITED STATES PATENTS

| | | |
|---|---|---|
| 214,716 | Shaw | Apr. 22, 1879 |
| 958,853 | Bulley | May 24, 1910 |
| 1,282,613 | Millea | Oct. 22, 1918 |
| 1,724,881 | Lund | Aug. 13, 1929 |
| 1,776,937 | Timbs | Sept. 30, 1930 |
| 2,241,665 | Herman | May 13, 1941 |
| 2,469,794 | Sloan | May 10, 1949 |
| 2,570,655 | Druge | Oct. 9, 1951 |
| 2,845,088 | Crausman et al. | July 29, 1958 |
| 2,861,589 | Ostwald | Nov. 25, 1958 |